United States Patent Office 3,825,550
Patented July 23, 1974

---

3,825,550
MANUFACTURE OF N-ARYLTHIAZOLE-2-SULFENAMIDE
Marion J. Gattuso, Hoffman Estates, Ill., assignor to Universal Oil Products Company, Des Plaines, Ill.
No Drawing. Continuation-in-part of abandoned application Ser. No. 98,082, Dec. 14, 1970. This application Feb. 22, 1973, Ser. No. 334,539
Int. Cl. C07d 91/44
U.S. Cl. 260—302 S 8 Claims

ABSTRACT OF THE DISCLOSURE

N-arylthiazole-2-sulfenamides are prepared by reacting at a reflux temperature in a solvent a thiazolesulfenamide which is unsubstituted or alkyl-substituted in the amide moiety with an arylamine and continuously removing the ammonia or amine which is evolved during the reaction by utilizing a solid absorbent.

CROSS-REFERENCE TO RELATED APPLICATION

This application is a continuation-in-part of co-pending application Ser. No. 98,082, filed Dec. 14, 1970 (now abandoned).

BACKGROUND OF THE INVENTION

Various benzothiazolesulfenamides are presently used as accelerators in the vulcanization of rubber. The sulfenamides being so used are the cycloalkyl, alkyl or oxyalkylene derivatives. Various methods are disclosed in the prior art for the preparation of these sulfenamides including, (1) oxidative condensation, (2) reaction between benzothiazole-sulfur chloride with a primary aliphatic amine, (3) reaction of metallic thiazoyl mercaptides with N-chloro derivatives of secondary amines and (4) reaction of a thiazoyl disulfide with an amine.

The above methods work satisfactorily in varying degrees for the preparation of the N-alkyl or N-cycloalkyl derivatives. Among these methods, it appears that the oxidative condensation method is preferred. In the oxidative condensation method, oxidizing agents as chlorine, sodium hypochlorite, iodine, hydrogen peroxide, etc. are used. Up to recently the prior art is practically silent as to the preparation of N-arylsulfenamide derivatives by the oxidative condensation process. Apparently, this silence is due to the fact that this method cannot be used in conventional manner to prepare the N-aryl derivatives. This inability to prepare the N-aryl derivatives by the oxidative condensation process is mentioned in the article *Thiazolesulfenamides* by Carr et al., *J. Organic Chemistry*, 14, 921–34 (1949).

DESCRIPTION OF THE INVENTION

The present invention offers a novel method for preparing N-arylthiazolesulfenamides which does not utilize oxidizing agents. It is believed that the reason the conventional oxidative condensation method did not perform satisfactorily is due to the fact that the oxidizing agent promotes the oxidation of the arylamine which is used as a reactant in forming the N-arylthiazolesulfenamide.

In one aspect an embodiment of this invention resides in a process for preparing an N-arylthiazolesulfenamide which comprises reacting in a solvent, at a reflux temperature of from about 30° to about 100° C., (1) a thiazolesulfenamide which is unsubstituted or mono- or dialkyl-substituted in the amide moiety, said alkyl substituents containing from 1 to 4 carbon atoms, with (2) an arylamine and continuously removing ammonia or amine evolved in the reaction by contacting with a molecular sieve or a vinyl resin sulfonic acid.

A specific embodiment of this invention is found in a process for preparing an N-arylthiazolesulfenamide which comprises reacting benzothiazole-2-sulfenamide with aniline in benzene at a reflux temperature in the range of from 80° to 85° C. and continuously removing the ammonia or amine which is evolved in the reaction by contact with molecular sieves.

Other objects and embodiments will be found in the following further detailed description of the present invention.

In a preferred embodiment, benzothiazole-2-sulfenamide is utilized as a reactant. In another embodiment the amide moiety may contain 1 or 2 alkyl substituents, preferably containing from 1 to about 6 and more particularly from 1 to 4 carbon atoms each. Illustrative examples in this embodiment include N-methylbenzothiazole-2-sulfenamide,
N-ethylbenzothiazole-2-sulfenamide,
N-propylbenzothiazole-2-sulfenamide,
N-butylbenzothiazole-2-sulfenamide,
N,N-dimethylbenzothiazole-2-sulfenamide,
N,N-diethylbenzothiazole-2-sulfenamide,
N,N-dipropylbenzothiazole-2-sulfenamide,
N,N-dibutylbenzothiazole-2-sulfenamide,
N-methyl-N-ethylbenzothiazole-2-sulfenamide,
N-methyl-N-propylbenzothiazole-2-sulfenamide,
N-methyl-N-butylbenzothiazole-2-sulfenamide,
N-ethyl-N-propylbenzothiazole-2-sulfenamide,
N-ethyl-N-butylbenzothiazole-2-sulfenamide, etc. Still other sulfenamides include 4,5-dimethylthiazole-2-sulfenamide,
4-ethylthiazole-2-sulfenamide,
naphthothiazole-2-sulfenamide,
4-phenylbenzothiazole-2-sulfenamide,
methylbenzothiazole-2-sulfenamide, etc. It is understood that the different sulfenamides are not necessarily equivalent as reactants in the present invention. The thiazole-2-sulfenamides may be obtained from any suitable source or prepared in accordance with various methods disclosed in the prior art.

As hereinbefore set forth, the thiazole-2-sulfenamide is reacted with an arylamine. The different arylamines may impart different properties to the final product and thus the particular arylamine will be selected with reference to the ultimate use of the sulfenamide. Illustrative arylamines include aniline, p-methylaniline, p-methoxyaniline p-chloroaniline, etc. Other substituted anilines include the o-, m- and p-alkylanilines in which the alkyl contains from 1 to 6 carbon atoms and 2,3-, 2,4-, 2,5-, 2,6-, 3,4- or 3,5-dialkylanilines, each alkyl containing 1 to 6 carbon atoms. Other amylamines include o-, m- or p-phenylenediamines, $N-C_1-C_{20}$ alkylanilines, diphenylamines, heterocyclic amines as, for example, amino pyridines, aminoquinolines, aminoindoles, etc. It is understood that the aryl nucleus may contain one or more substituents, preferably being selected from COOH, COOR, $NO_2$, SR, SH and OH where R is alkyl of 1 to 20 carbon atoms. Corresponding naphthyl amines may be used to prepare the N-naphthyl derivatives.

The different arylamines are not necessarily equivalent for use as reactants in the present invention.

The thiazole-2-sulfenamide and arylamine are reacted at a temperature of from about 30° to about 100° C. This conveniently is accomplished by heating the mixture to reflux in the presence of a suitable solvent. A particularly preferred solvent is benzene. Other solvents include n-pentane, methylpentane, dimethylpentane, n-hexane, methylhexane, n-heptane, methanol, ethanol, propanol, ethyl ether propyl ether, etc. It is understood that any suitable solvent which boils at a temperature of from about 30° to about 100° C. may be used. Atmospheric, subatmospheric or superatmospheric pressure may be used.

The thiazolesulfenamide and arylamine are reacted in equal molar proportions. However, an excess of the sulfenamide or arylamine may be employed, which excess generally will not exceed about 4:1 molar proportions. Accordingly, the reactants may be used in a mole proportion of from 1:1 to 4:1. Because the arylamine generally is less costly, it is preferred to utilize the arylamine in excess. The time of reaction will be sufficient to effect substantially complete conversion and may range from 15 and preferably from 20 to 50 hours or more.

During the reaction, ammonia or amine is evolved. In order to shift the equilibrium in the direction of the formation of the N-aryl-thiazole-2-sulfenamide, the evolved ammonia or amine is constantly removed from the reaction environment. Heretofore, it has been shown in the prior art that the removal of ammonia may be accomplished by using either a vacuum or by purging with nitrogen. However, the use of these methods entails the presence of additional equipment, said equipment comprising either a vacuum or means for introducing nitrogen into the reaction system. In contradistinction to this the present invention accomplishes this purpose by utilizing a suitable solid absorbent or solid reagent to retain the ammonia or amine. In one method this is accomplished by physical means in which a suitable size molecular sieve is employed. Illustrative molecular sieves include those which comprise zeolites such as mordenites and faujasites. The zeolites are crystalline aluminosilicates comprising cages or cavities interconnected by smaller pores or channels of definite size range characteristic of each zeolitic variety. Since the dimensions of the pores and channels are such as to accept molecules of certain dimension while rejecting those of larger dimensions the materials have come to be known as molecular sieves and utilized in many ways taking advantage of these properties.

The zeolites are generally described as a three-dimensional network of fundamental structural units consisting of silicon-centered $SiO_4$ and aluminum-centered $AlO_4$ tetrahedra interconnected by a mutual sharing of apical oxygen atoms to effect a chemical balance, each $AlO_4$ tetrahedra has a cation associated therewith, typically sodium. The $SiO_4$ and $AlO_4$ tetrahedra are arranged in a definite geometric pattern often visualized either in terms of chains, layers or polyhedra. The zeolites comprise well-defined intra-crystalline dimensions including intra-crystalline channels and pores whose narrowest cross section has essentially a uniform diameter. The various zeolites may be classified according to the geometric pattern of their framework with its attendant pore size, and by the $SiO_2:Al_2O_3$ mole ratio of their compositions.

One type of zeolite is mordenite. Mordenite is highly siliceous in nature and characterized by a $SiO_2:Al_2O_3$ mole ratio of from about 6 to about 12 as manufactured or found in its natural state. The mordenite crystal structure comprises four and five membered rings of $SiO_4$ and $AlO_4$ tetrahedra so arranged that the resulting crystal lattice comprises pores and channels running parallel along the crystal axis to give a tubular configuration. Mordenite is unique among zeolites since the channels or tubes do not intersect and access to the cages or cavities is in only one direction, thereby giving the zeolitic structure its two-dimensional nomenclature.

Another type of zeolite is faujasite. Faujasite is characterized by a $SiO_2:Al_2O_3$ ratio of about 2 to about 6 and by pore openings in the range of from about 6 to about 15 Angstroms. The fundamental structural units, $SiO_4$ and $AlO_4$ tetrahedra, are joined to form four membered and six membered rings and the rings are so arranged that the resulting structure resembles a truncated octahedron with the four membered ring forming six sides or faces thereof and the six membered ring forming the remaining eight sides or faces. The resulting truncated octahedra are interconnected at the hexagonal faces through a hexagonal prism formed by two of the six-membered rings of tetrahedra to form a crystal lattice comprising cavities or cages in open communication through channels, thereby giving the zeolitic structure its three-dimensional nomenclature. Other natural zeolites which may be utilized include analcite, chabazite, heulandite, natrolite, stilbite and thomsonite. It is also contemplated within the scope of the process of this invention that synthetic zeolites may also be utilized. The synthetic zeolites would include all those varieties ranging from gelatinous to porous or sandlike.

In another embodiment of the present invention the removal of the ammonia or amine is accomplished by utilizing a solid acidic reagent such as, for example, a vinyl resin sulfonic acid. These are resins which may also be termed as macroreticular sulfonic ion exchange resins. One such type of resin which is commercially available is that which is prepared by Rohm and Haas Company and is known as Amberlyst 15. This resin is a sulfonic type resin which is based on a styrene divinylbenzene copolymer. Another similar resin which is prepared by the Dow Company and available for use in the removal of ammonia or amine is that which is known as Dowex MSC–1. Representative examples of other sulfonic acid resins which may be used include those prepared by Rohm and Haas Company having the trade names Amberlite IR–120 and Amberlite IR–112 as well as those resins manufactured by Dow and bearing the trade names Dowex 50W–X16, Dowex 50W–X8 and Dowex 50–X8. As will be hereinafter shown in greater detail the use of these solid absorbents or ion exchange compounds will effectively remove any ammonia or amine which has been formed during the reaction and thus shift the equilibrium of the reaction whereby the desired product may be produced.

The N-arylbenzothiazole-2-sulfenamide is utilized as an additive to rubber. As a particular advantage, the N-arylbenzothiazole-2-sulfenamide serves to offset the decrease in scorch time which occurs when a secondary diamine antiozonant is incorporated in the rubber formulation. As hereinbefore set forth, the aryl derivative will be selected with reference to the particular rubber properties desired which, in turn, appear to be related to the basicity of the amine.

The N-arylsulfenamide will be used in a rubber formulation in conventional proportions, which may range from 0.5 to 3 and preferably from 1 to 2 parts of the sulfenamide per 100 parts of the rubber hydrocarbon in the formulation. The sulfenamide of the present invention is incorporated in the rubber formulation in any suitable manner and conveniently is incorporated during milling of the various ingredients into the rubber hydrocarbon. The various ingredients include, in addition to the sulfenamide of the present invention, carbon, zinc oxide, sulfur stearic acid, antioxidant, antiozonant, etc., all of these being used in conventional concentrations. Following the mixing, the mixture is subjected to vulcanization in conventional manner.

The following examples are introduced to illustrate further the novelty and utility of the present invention but not with the intention of unduly limiting the same.

EXAMPLE I

The sulfenamide of this example is N-phenylbenzothiazole-2-sulfenamide and was prepared by refluxing a mixture of 4.5 grams (0.025 mole) of benzothiazole-2-sulfenamide, 4.6 grams (0.05 mole) of aniline and 400 ml. of dry benzene. The refluxing was effected in a Soxhlet apparatus which contained Linde "13X" molecular sieves in the extraction thimble. The reflux continued for a total of 39½ hours, during which time an additional 4.6 grams of aniline was added, following which the reaction mixture was washed with three 200 ml. portions of water, dried and the benzene solvent removed by evaporation. The crude product was purified by recrystallization from diethyl ether. The N-phenylbenzothiazole-2-sulfenamide was recovered as a solid, having a melting point of 129–130° C., in a yield of 62% by weight. Composition of the product was determined by nuclear magnetic resonance, infra-red analysis and elemental analysis.

EXAMPLE II

Another preparation was made in substantially the same manner as described in Example I except that the extraction thimble contained 50 grams of type 4A molecular sieves. Specifically, 10 grams (0.055 mole) of benzothiazole-2-sulfenamide, 18.4 grams (0.2 mole) of aniline and 650 ml. of reagent grade benzene were refluxed for 25 hours. Following completion of the reaction, the benzene solution was washed with water and then concentrated to 50 ml. and allowed to crystallize overnight. The crystals were filtered and dried in vacuo. The desired N-phenylbenzothiazole-2-sulfenamide was recovered in a yield of 93% by weight.

EXAMPLE III

In another run similar to those described in the previous examples, the extraction thimble contained type 5A molecular sieves. The refluxing was continued for 24 hours and the desired N-phenylbenzothiazole-2-sulfenamide was recovered in a yield of 66% by weight based on the starting materials.

EXAMPLE IV

In this example the extraction thimble contained 20 grams of "Amberlyst 15" resin. The refluxing was continued for 23½ hours and the N-phenylbenzothiazole-2-sulfenamide was recovered in a yield of 68% by weight.

EXAMPLE V

This example describes the preparation of N-(p-tolyl) benzothiazole-2-sulfenamide and was effected by refluxing 3.6 grams (0.02 mole) of benzothiazole-2-sulfenamide, 2.14 grams (0.04 mole) of p-toluidine in 400 ml. of reagent grade benzene. The extraction thimble of the Soxhlet apparatus contained about 50 grams of type 4A molecular sieves. The N-(p-tolyl)benzothiazole-2-sulfenamide was recovered as a solid which, upon purification by elution chromatography on basic alumina, afforded the sulfenamide, m.p. 139–140° C.

EXAMPLE VI

This example describes the preparation of N-(p-methoxyphenyl)benzothiazole-2-sulfenamide and is effected in substantially the same manner as described in the previous examples by refluxing two moles of benzothiazole-2-sulfenamide and four moles of p-methoxyaniline in benzene solvent. The reaction thimble contains "Amberlyst 15" resin. Following completion of the reaction, the reaction mixture is washed with water, dried and the benzene solvent is removed by evaporation in vacuo. The N-(p-methoxyphenyl)benzothiazole-2-sulfenamide is recovered as a solid product.

EXAMPLE VII

In this example N-(p-chlorophenyl)benzothiazole-2-sulfenamide is prepared in substantially the same manner as described in the previous examples by refluxing one mole proportion of N-methylbenzothiazole-2-sulfenamide with three mole proportions of p-chloroaniline in the Soxhlet apparatus containing type 4A molecular sieves in the extraction thimble. Following completion of the reaction, the product is worked up in a manner similar to that heretofore described and the N-(p-chlorophenyl)-benzothiazole-2-sulfenamide is recovered as a solid product.

EXAMPLE VIII

In this example N-phenyl-4,5-dimethylthiazole-2-sulfenamide is prepared by refluxing a mixture of 4,5-dimethylthiazole-2-sulfenamide and aniline in ethanol solvent. Following completion of the reaction, the mixture is worked up in substantially the same manner as heretofore described and the solid material is recovered as the desired N-phenyl-4,5-dimethylthiazole-2-sulfenamide.

EXAMPLE IX

As hereinbefore set forth, the N-arylbenzothiazolesulfenamide serves to offset the decrease in scorch time encountered when a phenylenediamine antiozonant is incorporated in the rubber formulation. It is desirable and often necessary to incorporate a phenylenediamine antiozonant into the rubber formulation in order to protect the rubber from deterioration due to ozone attack.

This example reports the Mooney scorch properties of SBR (styrene-butadiene-rubber) formulation in which various N-arylbenzothiazolesulfenamides were incorporated, all at a concentration of 1.25 phr. (parts per 100 parts of rubber hydrocarbon). For comparative purposes the results obtained when using N-cyclohexylbenzothiazole-2-sulfenamide also are reported. As mentioned above, N-cyclohexylbenzothiazole-2-sulfenamide is presently used on a large scale in the commercial manufacture of rubber products.

The rubber formulation used in these runs was of the following recipe:

| Ingredient: | Parts by weight |
|---|---|
| SBR 1502 | 100 |
| Furnace black | 40 |
| Zinc oxide | 3 |
| Stearic acid | 2 |
| Sulfur | 2 |
| Sulfenamide | 1.25 |
| Antiozonant (when used) | 3.32 |

The ingredients were incorporated by conventional milling procedure and the formation was cured for 40 minutes at 140° C.

The scorch values were determined with the large rotor Mooney viscometer at 250° F. (ASTM D–1077–55T). The values represent the number of minutes for a rubber containing a curing agent to increase in viscosity by 5 and then 20 points. This method simulates conditions encountered during milling. A high scorch value indicates a high resistance to scorching.

The data in the following table reports the results of the evaluations.

| Run number | Benzothiazole sulfenamide | Antiozonant [1] | Mooney scorch 5 pt. rise | Mooney scorch 20 pt. rise |
|---|---|---|---|---|
| 1 | N-cyclohexyl | No | 56.1 | 60.8 |
| 2 | do | Yes | 18.0 | 20.5 |
| 3 | N-phenyl | No | 82.6 | 115.2 |
| 4 | do | Yes | 48.0 | 56.4 |
| 5 | N-p-methylphenyl | No | 80.4 | 105.6 |
| 6 | do | Yes | 43.7 | 49.8 |
| 7 | N-p-methoxyphenyl | No | 67.1 | 78.5 |
| 8 | do | Yes | 30.9 | 35.1 |

[1] N,N'-di-2-octyl-p-phenylenediamine.

As mentioned above, the sulfenamides were used in a concentration of 1.25 phr. The antiozonant was used in a concentration of 3.32 phr.

Referring to the data in the above table, it will be seen that the sulfenamides of the present invention offset the decrease in scorch encountered upon the addition of the antiozonant into the rubber formulation. For comparative purposes, it will be noted that this decrease in scorch time was considerably less than when using N-cyclohexylbenzothiazolesulfenamide.

EXAMPLE X

Also of importance is the proper curing of the rubber formulation in order to prepare a product of the desired physical properties. The specific physical properties desired will depend upon the ultimate use of the rubber product. For example, the ultimate elongation is an important requirement.

In the preparation as described in Example IX, the sample containing the same phenylenediamine antiozonant and N-cyclohexylbenzothiazolesulfenamide had an ultimate elongation of 550%. The samples containing the same antiozonant and N-phenyl, N-p-methylphenyl and N-p-methoxyphenyl derivatives had ultimate elongations of 445%, 520% and 575% respectively. Accordingly, for this requirement the N-p-methoxy derivative would be preferred.

EXAMPLE XI

When considering tensile strength of the rubber product as an important requirement, the N-p-methoxyphenyl derivative also appears to be the best of the N-aryl derivatives. The sample containing the same phenylenediamine antiozonant and the N-p-methoxyphenylbenzothiazolesulfenamide had a tensile strength of 2780 pounds. This is only slightly less than the tensile strength of 3000 pounds in the product containing the same phenylenediamine antiozonant and N-cyclohexylbenzothiazolesulfenamide.

I claim as my invention:

1. A process for preparing an N-arylthiazolesulfenamide which comprises reacting in a solvent, at a reflux temperature of from about 30° to about 100° C., (1) a thiazolesulfenamide which is unsubstituted or mono- or dialkyl-substituted in the amide moiety, said alkyl substituents containing from 1 to 4 carbon atoms, with (2) an arylamine and continuously removing ammonia or amine evolved in the reaction by contacting with a molecular sieve or a vinyl resin sulfonic acid.

2. The process as set forth in Claim 1 in which said solvent is benzene.

3. The process as set forth in Claim 1 in which said solvent is ethanol.

4. The process as set forth in Claim 1 in which said thiazole is benzothiazole-2-sulfenamide, said arylamine is aniline and said N-arylthiazole is N-phenylbenzothiazole-2-sulfenamide.

5. The process as set forth in Claim 1 in which said thiazole is benzothiazole-2-sulfenamide, said arylamine is p-toluidine and said N-arylthiazole is N-(p-tolyl)benzothiazole-2-sulfenamide.

6. The process as set forth in Claim 1 in which said thiazole is benzothiazole-2-sulfenamide, said arylamine is p-methoxyaniline and said N-arylthiazole is N-(p-methoxyphenyl)benzothiazole-2-sulfenamide.

7. The process as set forth in Claim 1 in which said thiazole is benzothiazole-2-sulfenamide, said arylamine is p-chloroaniline and said N-arylthiazole is p-chlorophenylbenzothiazole-2-sulfenamide.

8. The process as set forth in Claim 1 in which said thiazole is 4,5-dimethylthiazole-2-sulfenamide, said arylamine is aniline and said N-arylthiazole is N-phenyl-4,5-dimethylthiazole-2-sulfenamide.

References Cited

UNITED STATES PATENTS

| | | | |
|---|---|---|---|
| 2,370,253 | 2/1945 | Messer | 260—306.6 A |
| 2,560,020 | 7/1951 | Smith et al. | 260—306.6 A |
| 3,595,871 | 7/1971 | Campbell et al. | 260—306.6 A |

OTHER REFERENCES

The Condensed Chemical Dictionary, 6th ed., Reinhold, New York, 1961, pp. 759–60.

RICHARD J. GALLAGHER, Primary Examiner

U.S. Cl. X.R.

260—45.8, 306.6 A, 886